United States Patent
Huang et al.

(10) Patent No.: US 11,421,751 B2
(45) Date of Patent: Aug. 23, 2022

(54) VIBRATION-ISOLATING DEVICE BASED ON MAGNETIC DAMPING

(71) Applicant: EHOMA INDUSTRIAL CORPORATION, Taichung (TW)

(72) Inventors: Su-Wei Huang, Taichung (TW); Chao-Wei Yu, Taichung (TW); Chun-Huan Chuang, Taichung (TW)

(73) Assignee: EHOMA INDUSTRIAL CORPORATION, Taichung (TW)

(*) Notice: Subject to any disclaimer, the term of this patent is extended or adjusted under 35 U.S.C. 154(b) by 0 days.

(21) Appl. No.: 17/135,117

(22) Filed: Dec. 28, 2020

(65) Prior Publication Data
US 2022/0205507 A1  Jun. 30, 2022

(51) Int. Cl.
*F16F 15/03* (2006.01)
*B62J 11/00* (2020.01)

(52) U.S. Cl.
CPC .............. *F16F 15/03* (2013.01); *B62J 11/00* (2013.01); *F16F 2222/06* (2013.01); *F16F 2230/0005* (2013.01)

(58) Field of Classification Search
CPC .................. F16F 15/03; F16F 2222/06; F16F 2230/0005; F16F 15/022; B62J 11/00
See application file for complete search history.

(56) References Cited

U.S. PATENT DOCUMENTS

| | | | | |
|---|---|---|---|---|
| 5,521,448 A | * | 5/1996 | Tecza | F16C 27/08 310/90.5 |
| 6,262,505 B1 | * | 7/2001 | Hockney | H02K 7/083 310/90.5 |
| 2008/0106015 A1 | * | 5/2008 | Fushimi | F16F 15/08 267/140.15 |

FOREIGN PATENT DOCUMENTS

CN   111845905 A  * 10/2020
KR   200479927 Y1 * 3/2016

* cited by examiner

*Primary Examiner* — Melanie Torres Williams
(74) *Attorney, Agent, or Firm* — Muncy, Geissler, Olds & Lowe, P.C.

(57) ABSTRACT

A vibration-isolating device based on magnetic damping includes a housing and an internal seat. The housing receives a first magnetic member and has a first buffer. The internal seat has a base portion received in the housing and has a raised portion protruding from the housing. The base portion has a second magnetic member positionally opposite to the first magnetic member to generate a damping effect. A second buffer is between the base portion and the housing and aligned with the first buffer. When an object is fixed to the raised portion, the object and the housing jointly hold the first buffer and leave a gap therebetween. The housing and the base portion hold the second buffer therebetween. When the object receives vibration, the first buffer and the second buffer damp the vibration first and the internal seat uses the damping effect to counteract any remaining part of the vibration.

8 Claims, 6 Drawing Sheets

VIBRATION-ISOLATING DEVICE BASED ON MAGNETIC DAMPING

BACKGROUND OF THE INVENTION

1. Field of the Invention

The present invention relates to a vibration-isolating device, and more particularly to a vibration-isolating device that uses magnetic members to generate a damping effect so as to protect an object from vibration.

2. Description of the Related Art

A conventional support is used to fix an object for convenient operation. For example, a phone holder is a popular accessory for motorcycles installed near one rear-view mirror on the handlebar of a motorcycle for a motorcycle rider to place his/her mobile phone. With a phone holder, a motorcycle rider can conveniently operate the mobile phone when the motorcycle is stationary.

However, such a conventional support is typically made without any vibration-isolating feature and tends to transfer vibration from where it is installed to what it is holding. For instance, when a motorcycle, a car, or a different vehicle is started and has start-up vibration, the vibration is likely to proliferated to a phone holder installed on the motorcycle and cause a mobile phone cradled by the phone holder to vibration. Such shaking not only prevents a user from viewing the screen of the mobile phone clearly but also tends to damage the delicate camera lenses on the mobile phone. Hence, there is a need for an effective vibration-isolating device to prefect the conventional supports.

SUMMARY OF THE INVENTION

In order to address the foregoing issues, the present invention provides a vibration-isolating device based on magnetic damping, which uses a buffer and a magnetic member to damp and counteract vibration.

In one embodiment of the present invention, a vibration-isolating device based on magnetic damping configured to hold an object in a manner that the object is protected from vibration comprises a housing and an internal seat. The housing defines therein an accommodating space. The housing has a bottom in the accommodating space provided with a first magnetic member. The housing has its top portion provided with a first buffer. The internal seat has a base portion received in the accommodating space, and has a raised portion protruding from the top portion of the housing. The base portion is provided with a second magnetic member positionally opposite to the first magnetic member to generate a damping effect. A second buffer is provided between the base portion and the top portion of the housing. The second buffer is located in the accommodating space and aligned with the first buffer across the housing. The object is fixed to the raised portion at where the raised portion protruding from the top portion of the housing. The object and the top portion of the housing jointly hold the first buffer and leave a gap therebetween. The top portion of the housing and the base portion jointly hold the second buffer therebetween.

Thereby, when the object receives vibration, the vibration-isolating device damps the vibration using the first buffer and the second buffer to reduce swing of the object. The swing caused by the remaining part of vibration proliferated to the internal seat existing after the foregoing damping can be further counteracted by the damping effect generated between the first magnetic member and the second magnetic member, so that the object can return to its initial position rapidly, thereby effectively reducing vibration, ensuring easy viewing and operation, and protecting the object from vibration.

DETAILED DESCRIPTION OF THE INVENTION

Figure 1:
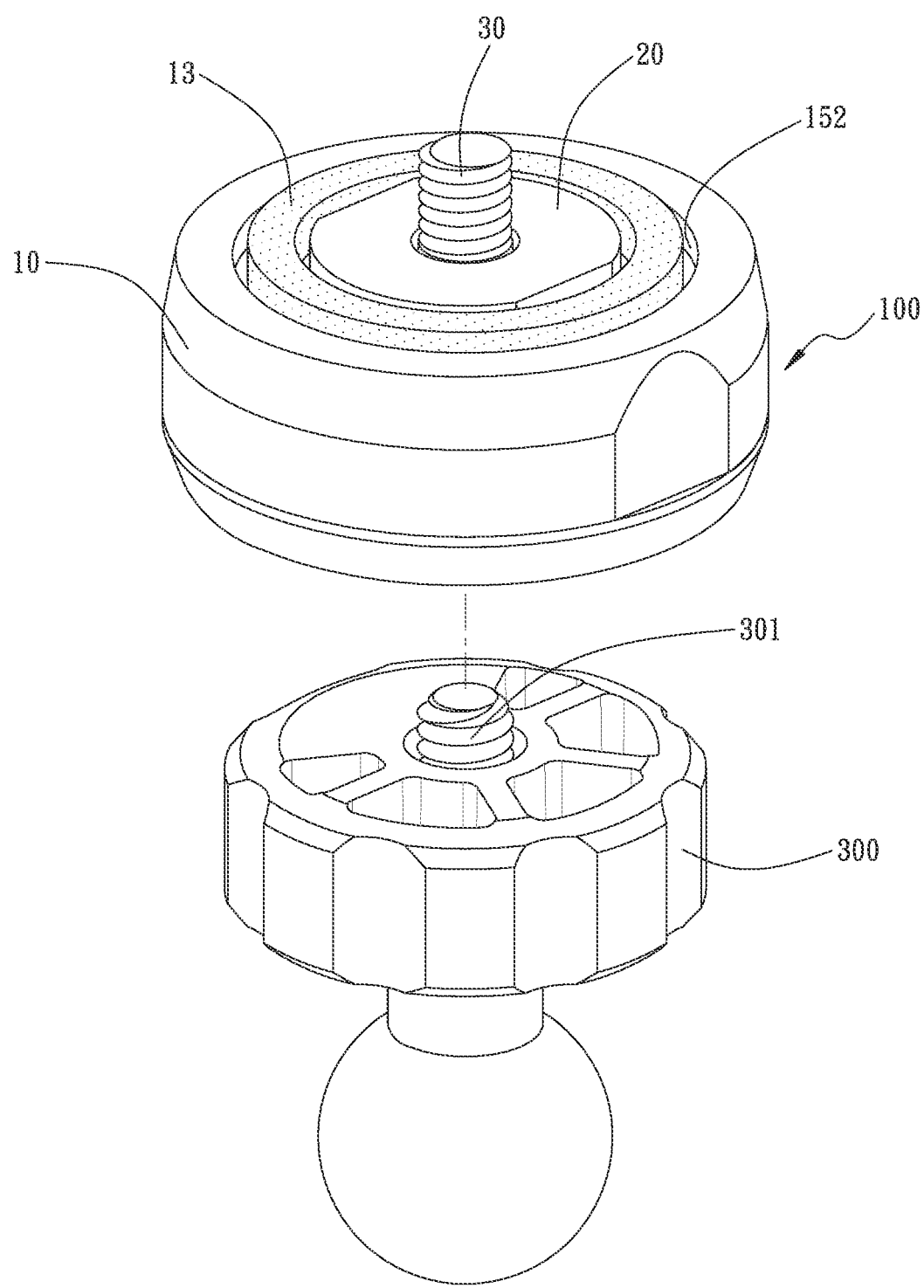
FIG. 1 is a perspective view of a first embodiment of the present invention.
Figure 2:
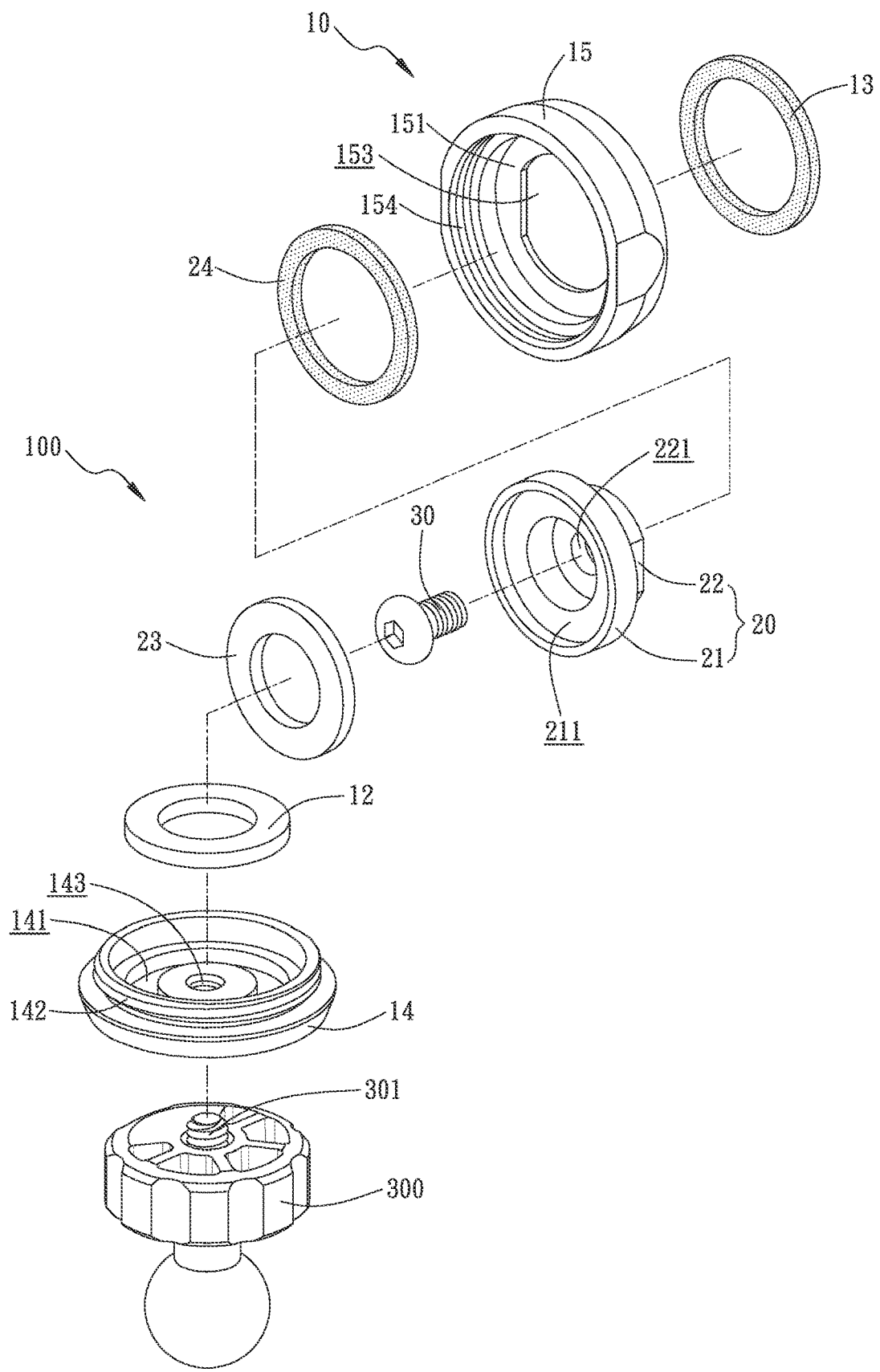
FIG. 2 is an exploded view of the first embodiment of the present invention.

The following preferred embodiments when read with the accompanying drawings are made to clearly exhibit the above-mentioned and other technical contents, features and effects of the present invention. Through the exposition by means of the specific embodiments, people would further understand the technical means and effects the present invention adopts to achieve the above-indicated objectives. However, the accompanying drawings are intended for reference and illustration, but not to limit the present invention and are not made to scale.

Referring to FIG. 1 through FIG. 6, the present invention provides a vibration-isolating device 100 based on magnetic damping, which is configured to hold an object in a manner that the object is protected from vibration. The object in the present embodiment is a phone holder 200 to be installed on a motorcycle. The vibration-isolating device 100 comprises a housing 10 and an internal seat 20. FIG. 1 through FIG. 5 shows a first embodiment of the vibration-isolating device 100.

The housing 10 has an accommodating space 11. The housing 10 has a bottom in the accommodating space 11 provided with a first magnetic member 12. The first magnetic member 12 in the present embodiment is a permanent magnet. The housing 10 has a top portion provided with a first buffer 13. The first buffer 13 in the present embodiment is made of polyurethane (PU).

The internal seat 20 has a base portion 21 received in the accommodating space 11, and has a raised portion 22 raised from the top portion of the housing 10. The base portion 21 is provided with a second magnetic member 23. The second magnetic member 23 in the present embodiment is also a permanent magnet. The second magnetic member 23 and the first magnetic member 12 are installed opposite to each other in the accommodating space 11 so as to jointly generate a damping effect. A second buffer 24 is placed between the base portion 21 and the top portion of the housing 10. The second buffer 24 in the present embodiment is also made of polyurethane. The second buffer 24 is received in the accommodating space 11 and aligned with the first buffer 13 across the housing 10.

The first buffer 13 and the second buffer 24 of the present embodiment are both made of polyurethane, but not limited thereto. In other embodiments, the first buffer 13 and the second buffer 24 may each be a spring or another elastic and buffing object. In addition, the first magnetic member 12 and the second magnetic member 23 in the present embodiment are each a permanent magnet, but not limited thereto. In other embodiments, they may each be an electromagnet or a magnetic object that provides the desired damping effect.

In the present embodiment, the housing 10 further comprises a chassis 14 and a cap 15. The cap 15 has a ring-like shape. The cap 15 has an inner circular portion 151 near its top portion. The top portion of the cap 15 is formed with a circular groove 152 positionally corresponding to the inner circular portion 151. The first buffer 13 is received in the circular groove 152. Therein, the first buffer 13 has a height greater than a depth of the circular groove 152, so that the first buffer 13 when installed slightly protrudes from the cap 15. The cap 15 has an opening 153 in the inner circular portion 151. The raised portion 22 passes through the opening 153 and exposed outside the cap 15. The first buffer 13 and the second buffer 24 are located inside and outside the inner circular portion 151, respectively, and abut against the inner circular portion 151.

Figure 3:
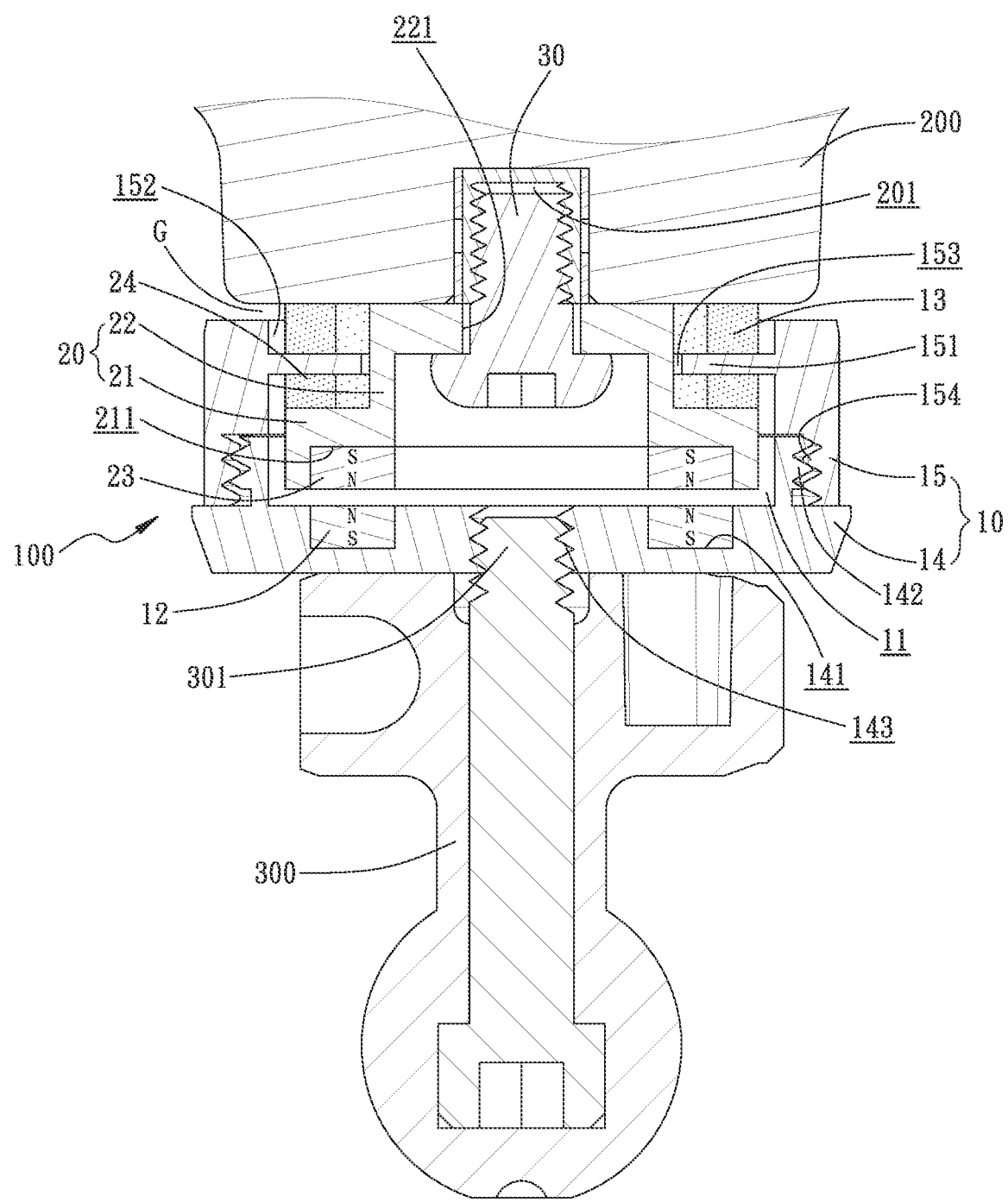
FIG. 3 is a cross-sectional view of the first embodiment of the present invention.

Preferably, in the present embodiment, the chassis 14 has a first circular trench 141, and the base portion 21 has its bottom formed with a second circular trench 211. The second circular trench 211 and the first circular trench 141 face each other. The first magnetic member 12 and the second magnetic member 23 are both circular and received in the first circular trench 141 and the second circular trench 211, respectively. In the present embodiment, the first magnetic member 12 and the second magnetic member 23 when received in the accommodating space 11 face each other with their same magnetic poles (both with the north poles N) (as shown in FIG. 3). The internal seat 20 floats in the accommodating space 11 with respect to the housing 10 in virtue of the repulsion between the same poles and thus provides the damping effect.

Furthermore, in the present embodiment, the chassis 14 has a first engaging portion 142 and the cap 15 has a second engaging portion 154. The second engaging portion 154 is configured corresponding to the first engaging portion 142. In the present embodiment, the first engaging portion 142 is an externally threaded portion and the second engaging portion 154 is an internally threaded portion. When the chassis 14 has the first engaging portion 142 engaged with the second engaging portion 154 of the cap 15, the accommodating space 11 is defined therebetween. Addition, in the present embodiment, the chassis 14 is centrally formed with a threaded hole 143.

Figure 6:
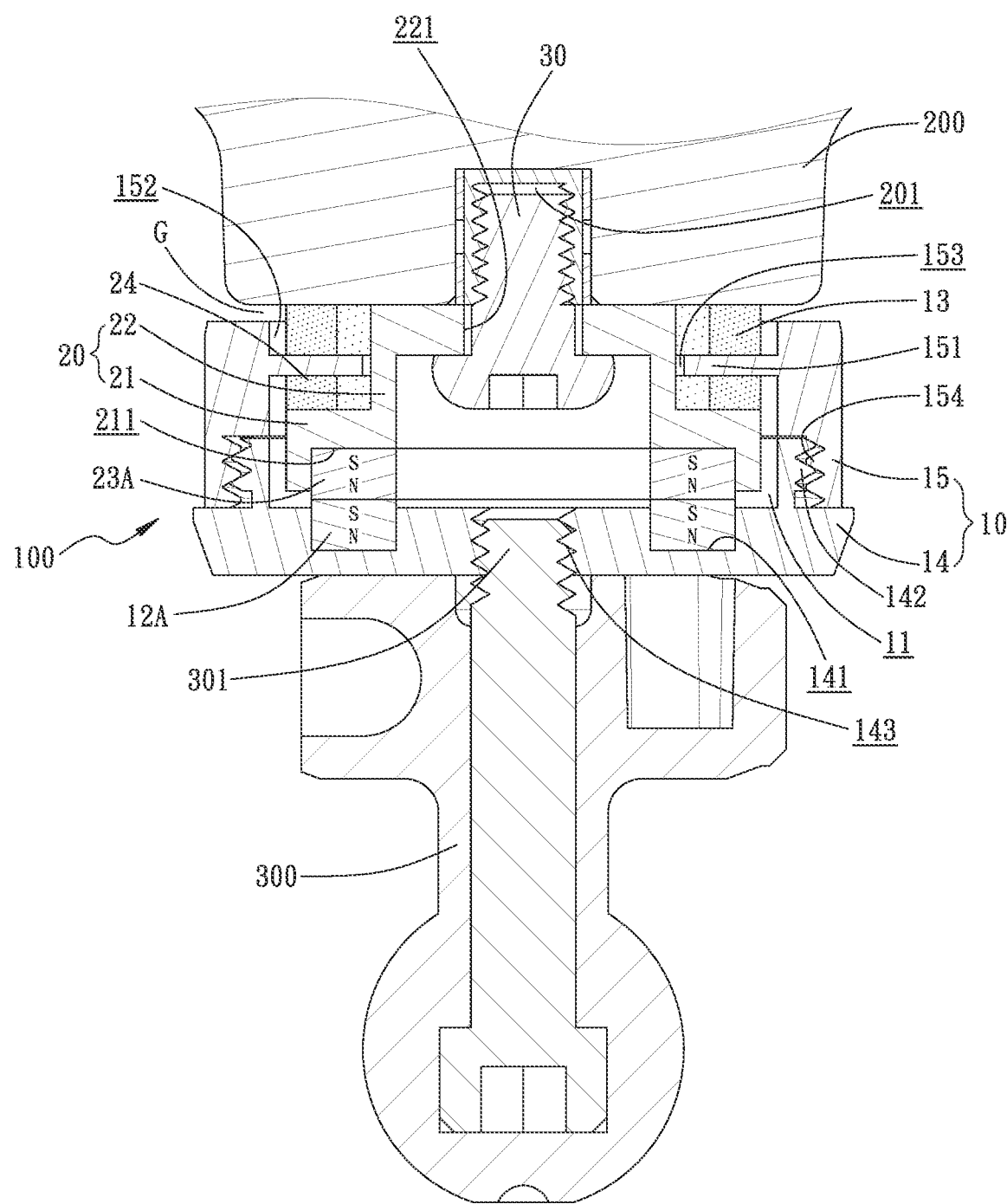
FIG. 6 is a cross-sectional view of a second embodiment of the present invention.

In the present embodiment, the raised portion 22 has a through hole 221. The through hole 221 in the present embodiment is for a fastening member 30 to pass through and then to be screwed into a threaded hole 201 formed on a phone holder 200, so that the phone holder 200 is fixed to the raised portion 22 protruding from the top portion of the housing 10. At this time, the phone holder 200 and the inner circular portion 151 jointly hold the first buffer 13 therebetween, Since the height of the first buffer 13 is greater than the depth of the circular groove 152, a gap G is left below the phone holder 200 and above the top portion of the housing 10 (as shown in FIGS. 3 and 6). Meanwhile, the top portion of the housing 10 and the base portion 21 jointly hold the second buffer 24 therebetween. Consequently, in the present embodiment, the internal seat 20 is not in direct contact with the housing 10. Instead, it is positioned with respect to and separated from the housing 10 by the first buffer 13 and the second buffer 24.

Figure 4:
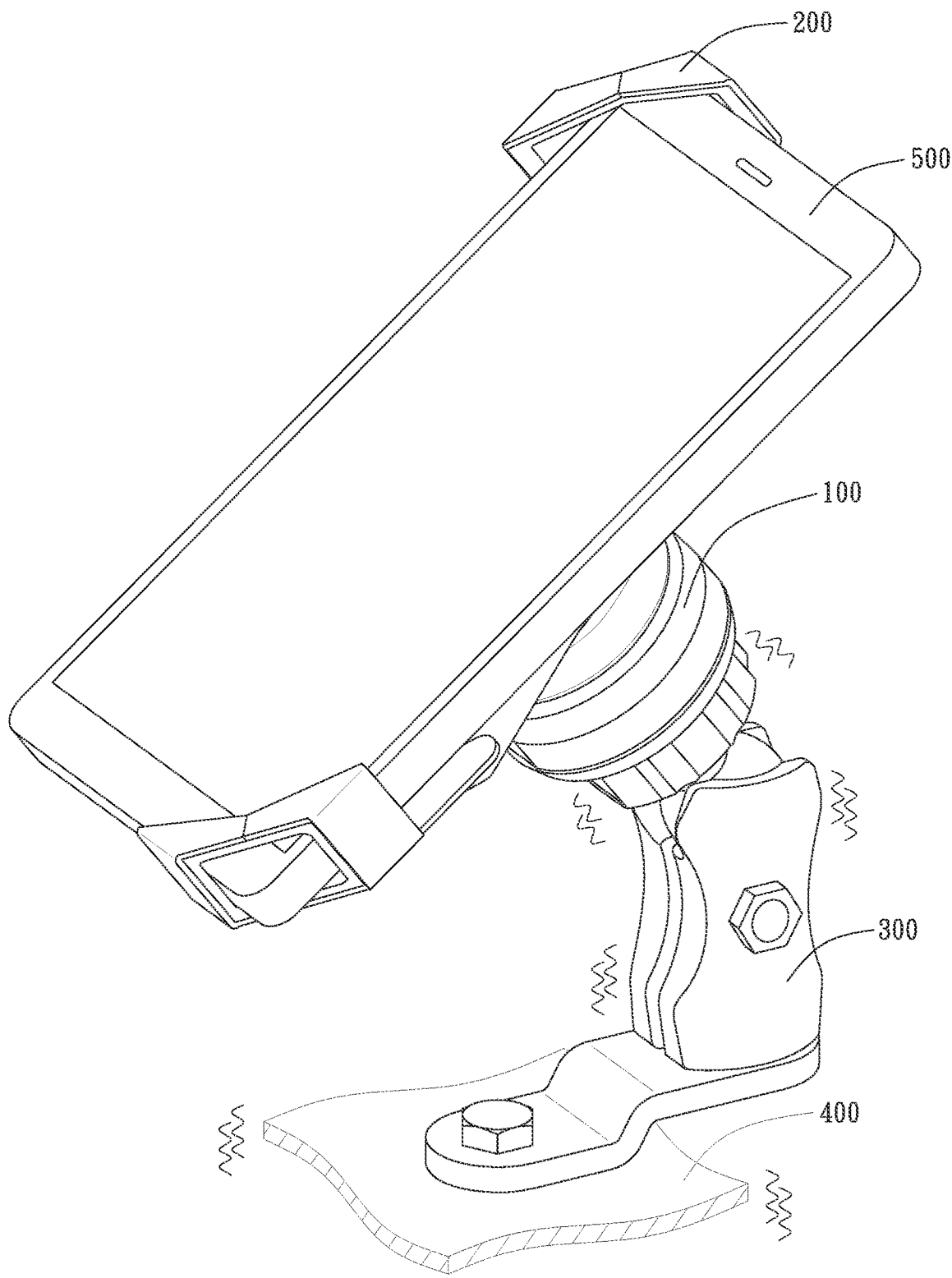
FIG. 4 is an applied view of the first embodiment of the present invention, showing the support installed on a handlebar and shaking.

In use, the vibration-isolating device 100 described previously works with a mount 300 that has been fixed to the handlebar 400 in advance. Then the phone holder 200 is fixed to the top portion of the housing 10 at the top of the raised portion 22. Subsequently, the mount 300 is combined with the chassis 14 as its bolt 301 is screwed into the threaded hole 143, so that the phone holder 200 and the mount 300 connected through the vibration-isolating device 100, and a smartphone 500 can be placed in the phone holder 200 (as shown in FIG. 4).

Figure 5:
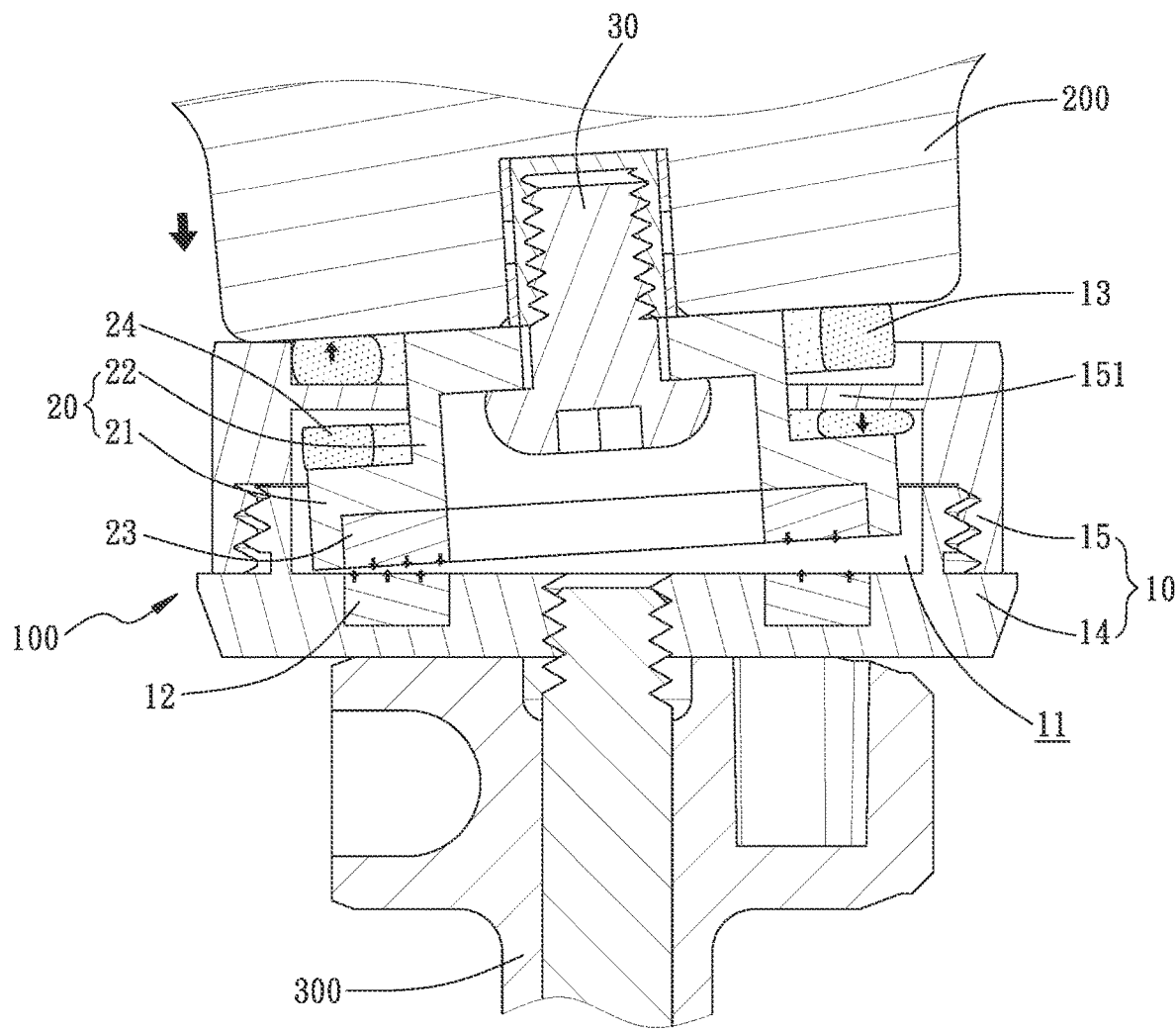
FIG. 5 is a schematic drawing depicting the moment when an internal seat of the first embodiment of the present invention moves with a phone holder mounted thereon, wherein the magnitude of swing is exaggerated for illustration.

When a motorcycle (not shown) having the handlebar 400 is started and make the handlebar 400 vibration as it vibrates, the vibration can be proliferated to the mount 300 and the housing 10 fixed to it. Before the vibration propagates to the phone holder 200, the first buffer 13 and the second buffer 24 damp the vibration first. For example, as shown in FIG. 5, at the moment when the phone holder 200 vibrations and swings to the left side of the drawing, the phone holder 200 presses against the left side of the first buffer 13 while the base portion 21 is driven by the phone holder 200 to press against the right side of the second buffer 24, so the first buffer 13 and the second buffer 24 receive the vibration and damp the swing of the phone holder 200. Afterward, the remaining part of vibration existing after the foregoing damping may make the internal seat 20 swing within the accommodating space 11. As shown in FIG. 5, at the moment when the internal seat 20 swings so that its left side is dose to the chassis 14, the damping effect caused by the repulsion between the same poles of the first magnetic member 12 and the second magnetic member 23 can instantly counteract the swing of the internal seat 20, thereby returning the internal seat 20 to its initial position in the accommodating space 11.

From the above description it is clear that the present invention has the following features. When an object (such as the phone holder 200 of the foregoing embodiment) mounted on the vibration-isolating device 100 receives vibration, the vibration-isolating device 100 damps the vibration using the first buffer 13 and the second buffer 24 to reduce swing of the object. The swing caused by the remaining part of the vibration proliferated to the internal seat 20 existing after the foregoing damping can be further counteracted by the damping effect generated between the first magnetic member 12 and the second magnetic member 23, so that the object can return to its initial position rapidly, thereby effectively reducing vibration proliferated to the object and keeping the object relatively stable for easy viewing and operation.

FIG. 6 illustrates a second embodiment of the present invention. The second embodiment, similar to the first embodiment, has a housing 10 and an internal seat 20, and is different from the first embodiment for that the first magnetic member 12A and the second magnetic member 23A are installed in the accommodating space 11 with their opposite magnetic poles facing each other (e.g., one with the north pole N and the other with the south pole S). In this way, the first magnetic member 12A and the second magnetic member 23A use the attraction of their opposite poles to generate the desired damping effect, thereby protecting the object from vibration like the first embodiment does.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A vibration-isolating device based on magnetic damping, configured to hold an object in a manner that the object is protected from vibration, the vibration-isolating device comprising:
a housing, defining therein an accommodating space, the housing having a bottom in the accommodating space provided with a first magnetic member, and having a top portion provided with a first buffer;
an internal seat, having a base portion received in the accommodating space, and having a raised portion configured to protrude from the top portion of the housing; the base portion being provided with a second magnetic member; the second magnetic member and the first magnetic member being installed opposite to each other in the accommodating space so as to jointly generate a damping effect; a second buffer being placed between the base portion and the top portion of the housing; the second buffer being received in the accommodating space and aligned with the first buffer across the housing; the object being fixed to the raised portion at where the raised portion protruding from the top portion of the housing; the object and the top portion of the housing jointly holding the first buffer and leave a gap therebetween; and the top portion of the housing and the base portion jointly holding the second buffer therebetween, whereby when the object receives vibration, the first buffer and the second buffer damp the vibration acting on the object and the internal seat further using the damping effect to counteract any remaining part of the vibration to return the object to an initial position thereof.

2. The vibration-isolating device of claim 1, wherein the housing comprises a chassis and a cap; the cap having an inner circular portion near a top portion thereof; a top portion of the cap being formed with a circular groove positionally corresponding to the inner circular portion; the first buffer being received in the circular groove and having a height that is greater than a depth of the circular groove; the cap having an opening in the inner circular portion for the raised portion to pass therethrough and get exposed outside the cap; and the first buffer and the second buffer being located inside and outside the inner circular portion, respectively, and abutting against the inner circular portion.

3. The vibration-isolating device of claim 2, wherein the first buffer and the second buffer are both made of polyurethane.

4. The vibration-isolating device of claim 2, wherein the chassis has a first circular trench, and the base portion has a bottom provided with a second circular trench that faces the first circular trench, in which the first magnetic member and the second magnetic member are both circular and received in the first circular trench and the second circular trench, respectively.

5. The vibration-isolating device of claim 4, wherein the first magnetic member and the second magnetic member face each other with same magnetic poles, so that the internal seat floats in the accommodating space with respect to the housing in virtue of repulsion between the same poles.

6. The vibration-isolating device of claim 5, the first magnetic member and the second magnetic member are each a permanent magnet.

7. The vibration-isolating device of claim 2, wherein the chassis has a first engaging portion, and the cap has a second engaging portion corresponding to the first engaging portion, in which one of the first engaging portion and the second engaging portion is an externally threaded portion and the other is an internally threaded portion so that the first and second engaging portions are configured to be threadedly combined with each other.

8. The vibration-isolating device of claim 2, wherein the raised portion has a through hole for a fastening member to pass therethrough and then to be screwed into a threaded hole formed on the object, and the chassis is centrally formed with a threaded hole for a mount to combine thereto with a bolt.

* * * * *